(12) United States Patent
Schwartz (10) Patent No.: US 7,921,150 B1
(45) Date of Patent: Apr. 5, 2011

(54) METHOD FOR VIEWING VIDEOS ON DISTRIBUTED NETWORKS

(75) Inventor: Michael S. Schwartz, Belmont, MA (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 12/604,641

(22) Filed: Oct. 23, 2009

(51) Int. Cl.
*G06F 15/16* (2006.01)
*G06F 3/00* (2006.01)
*G06F 13/00* (2006.01)

(52) U.S. Cl. ........ 709/201; 709/231; 709/206; 715/719; 715/723; 725/37

(58) Field of Classification Search .................. 709/206, 709/217–228, 231; 715/716–726; 725/37
See application file for complete search history.

(56) References Cited

U.S. PATENT DOCUMENTS

| | | | |
|---|---|---|---|
| 6,961,463 B1 | 11/2005 | Loui et al. | |
| 7,020,689 B2* | 3/2006 | Simyon et al. | 709/206 |
| 7,058,689 B2* | 6/2006 | Parker et al. | 709/206 |
| 7,080,124 B1* | 7/2006 | Shankar | 709/206 |
| 7,295,608 B2 | 11/2007 | Reynolds et al. | |
| 7,325,036 B2* | 1/2008 | Simyon et al. | 709/206 |
| 7,359,955 B2 | 4/2008 | Menon et al. | |
| 7,441,040 B2 | 10/2008 | Asai | |
| 7,539,783 B2 | 5/2009 | Kochunni et al. | |
| 7,567,812 B2 | 7/2009 | Herrod et al. | |
| 7,650,381 B2* | 1/2010 | Peters | 709/205 |
| 2004/0078439 A1* | 4/2004 | Staack | 709/206 |
| 2004/0230659 A1* | 11/2004 | Chase | 709/206 |
| 2005/0027810 A1* | 2/2005 | Donovan | 709/206 |
| 2005/0044157 A1* | 2/2005 | Bartholomew Donovan | 709/206 |
| 2006/0075033 A1* | 4/2006 | Bienstock et al. | 709/206 |
| 2007/0271348 A1* | 11/2007 | Yang | 709/206 |
| 2008/0021968 A1* | 1/2008 | Majors et al. | 709/206 |
| 2008/0155029 A1* | 6/2008 | Helbling et al. | 709/206 |
| 2008/0160911 A1* | 7/2008 | Chou et al. | 455/7 |
| 2008/0175214 A1* | 7/2008 | Hasegawa et al. | 370/338 |
| 2008/0178198 A1 | 7/2008 | Gauba | |
| 2008/0181260 A1* | 7/2008 | Vonog et al. | 370/519 |
| 2008/0195730 A1* | 8/2008 | Hasegawa et al. | 709/224 |
| 2009/0010068 A1 | 1/2009 | Lee | |
| 2009/0028146 A1* | 1/2009 | Kleyman et al. | 370/389 |
| 2009/0070473 A1* | 3/2009 | Baum et al. | 709/227 |
| 2009/0094684 A1* | 4/2009 | Chinnusamy et al. | 726/4 |
| 2009/0320073 A1* | 12/2009 | Reisman | 725/51 |
| 2010/0053307 A1* | 3/2010 | Fang et al. | 348/46 |
| 2010/0094966 A1* | 4/2010 | Zuckerman et al. | 709/219 |

* cited by examiner

*Primary Examiner* — Haresh N Patel
(74) *Attorney, Agent, or Firm* — Kevin E Spaulding (57) ABSTRACT

A method for viewing digital video assets using a distributed network comprising a user on a first node requesting to view a digital video asset stored on a second node; relaying the request from the first node to the second node; establishing a peer-to-peer link between the first and second nodes; creating a video stream from the requested digital video asset on the second node using a standard video stream server; receiving the video stream using a stream relay client on the second node and converting it into a form that is compatible with the peer-to-peer link; sending the converted video stream to the first node over the peer-to-peer link; receiving the converted video stream using a stream relay server and converting it into a standard video stream form; and viewing the video stream on the first node of the distributed network using a standard video stream client.

14 Claims, 4 Drawing Sheets

METHOD FOR VIEWING VIDEOS ON DISTRIBUTED NETWORKS

CROSS REFERENCE TO RELATED APPLICATIONS

Reference is made to commonly assigned, co-pending U.S. patent application Ser. No. 12/362,762, filed Jan. 30, 2009 entitled: "System for Managing Distributed Assets and Metadata", by L. Blomstedt, et al, which is incorporated herein by reference.

FIELD OF THE INVENTION

The present invention relates to the architecture, services, and methods for sharing digital video data among multiple devices, and systems. Specifically, the present invention relates to allowing users of peer-to-peer networks to stream videos from one node of the network to another.

BACKGROUND OF THE INVENTION

Videos form an increasingly important part of people's photographic collections. In many cases the owner of a video will wish to make that video available to a user on a computer which is different from the computer on which the video resides. In some cases this is because the user owns more than one computer and wants to be able to view the video anywhere. In other cases the owner wishes to share the video with other individuals. There are currently two methods in use for accessing videos which are on other computers. In the first method the full video file is moved from one computer to the other and then played. This method has the disadvantage of making the user wait for the transfer to complete before seeing the video. Because video files are often large, this delay can be long. In the second method, called "streaming" a video can be transferred to another computer and played in one step. The advantage to the user in streaming the video is that no delay is experienced between requesting the video and viewing it. The standard format for sending video streams, RTSP, allows a user to interact with the video playback (for example, by pausing the playback or rewinding the stream) so that the user has the illusion of playing a video file located locally. Streaming has an additional advantage in that the owner of the video does not give up control over the video file itself, since the actual file is not transferred. Therefore, a person can share a video without having to worry that recipients will themselves share the video with other people.

Many internet sites exist which allow a user to upload videos to a central server which can then stream those videos to other computers. The best known is "youtube". Although these websites are popular, they do force people to go to the trouble of uploading each video they wish to share. Furthermore, because providing storage for large numbers of videos is expensive, video sharing sites limit the length and resolution of the videos which can be uploaded.

A more convenient way of sharing videos would be to take advantage of peer-to-peer networking. In a peer-to-peer network each computer on the network is in direct contact with all other computers on the network. Each of these computers (called "nodes") can act as either a client or a server as required. In a peer-to-peer network videos do not have to be uploaded because each file can be made accessible by the network wherever it resides.

Several well-known technologies for creating peer-to-peer networks exist, but implementations of these technologies tend to use them for transferring files rather than for streaming. Existing systems which do implement peer-to-peer streaming have the disadvantage of tightly integrating the streaming technology with the peer-to-peer technology. This tight integration has some disadvantages. Some of these disadvantages stem from the lack of standardization of video formats. Many file formats exist for storing videos. Examples are mpeg, mov, avi, and wma formats. In addition, all of these file formats support multiple encodings of the video data, with each encoding requiring a separate coding/decoding module ("CODEC"). Some of these formats and encodings are open, while others are proprietary. To work effectively, both the stream server (which reads in the files) and the stream client (which displays the resulting stream) must have access to the proper CODEC for the particular video stream, which puts significant constraints on the design of the components of the peer-to-peer system.

SUMMARY OF THE INVENTION

The present invention represents a method for viewing digital video assets using a distributed network having a plurality of interconnected nodes, comprising:

receiving a request from a user on a first node of the distributed network to view a digital video asset stored on a second node of the distributed network;

relaying the request from the first node of the distributed network to the second node of the distributed network;

establishing a peer-to-peer link between the first node of the distributed network and the second node of the distributed network;

creating a video stream in a standard video stream format from the requested digital video asset on the second node of the distributed network using a standard video stream server that has not been specially adapted for use in a distributed network;

receiving the video stream using a stream relay client on the second node of the distributed network;

converting the video stream on the stream relay client into a form that is compatible with the peer-to-peer link;

sending the converted video stream from the second node of the distributed network to the first node of the distributed network over the peer-to-peer link;

receiving the converted video stream using a stream relay server on the first node of the distributed network;

converting the converted video stream on the stream relay server into a standard video stream form, forming a standard video stream; and viewing the standard video stream on the first node of the distributed network using a standard video stream client that has not been specially adapted for use in a distributed network.

The present invention has the advantage that videos can be conveniently streamed over a peer-to-peer network so that a video files residing on one computer can be watched by a person using a second computer.

The present invention has the additional advantage that it enables any node in a distributed network to stream video using any standard video server and to view video using any standard video client so that implementers of the system can easily provide for the various formats and encodings used with video files. This is accomplished without the streaming video server or video client needing to be altered in order to meet the requirements of the peer-to-peer network A further advantage of this invention is that it streams videos between peer-to-peer nodes by using stream relay clients and servers. A stream relay client on the peer node containing the video file captures a local broadcast of the file and diverts it into the peer-to-peer channel. A stream relay server on the receiving node receives the video stream from the peer-to-peer channel and rebroadcasts it on that node so that a standard video client can receive it.

Yet another advantage of the present invention is that it takes advantage of the use of the standard RTSP protocol utilized by commercial streaming servers and clients to transmit video streams. The invention parses the control information in the RTSP stream to direct its own processing of the video stream. The invention does not process the data or Quality of Service packets within the stream but only relays them on to the client. In this way the system is able to transmit a variety of video streams without being sensitive to details of the specific video file format or the CODEC used in encoding the video data.

Another advantage of the present invention is that it is able to determine which node on which to perform transcoding of the video stream. This enables the transmission of video data between nodes which have different transcoding capabilities.

Another advantage of the present invention is that it enables transcoding of the video data to account for the capabilities of the receiving node. The method can automatically determine which node on the distributed network should be used to perform the transcoding of the video data. This enables the transmission of video data between nodes which have different transcoding capabilities.

An additional advantage of the present invention is that it provides a mechanism to adjust the video stream to be compatible with the viewing resolution and capabilities of the system being used to view the video. Additionally, it supports the application of video enhancement processing. The method can automatically determine which node on the distributed network should be used to adjust the viewing resolution and apply the video enhancement processing. This facilitates the transmission of video data between nodes having different viewing resolutions and different video processing capabilities.

DETAILED DESCRIPTION OF THE INVENTION

Figure 1:
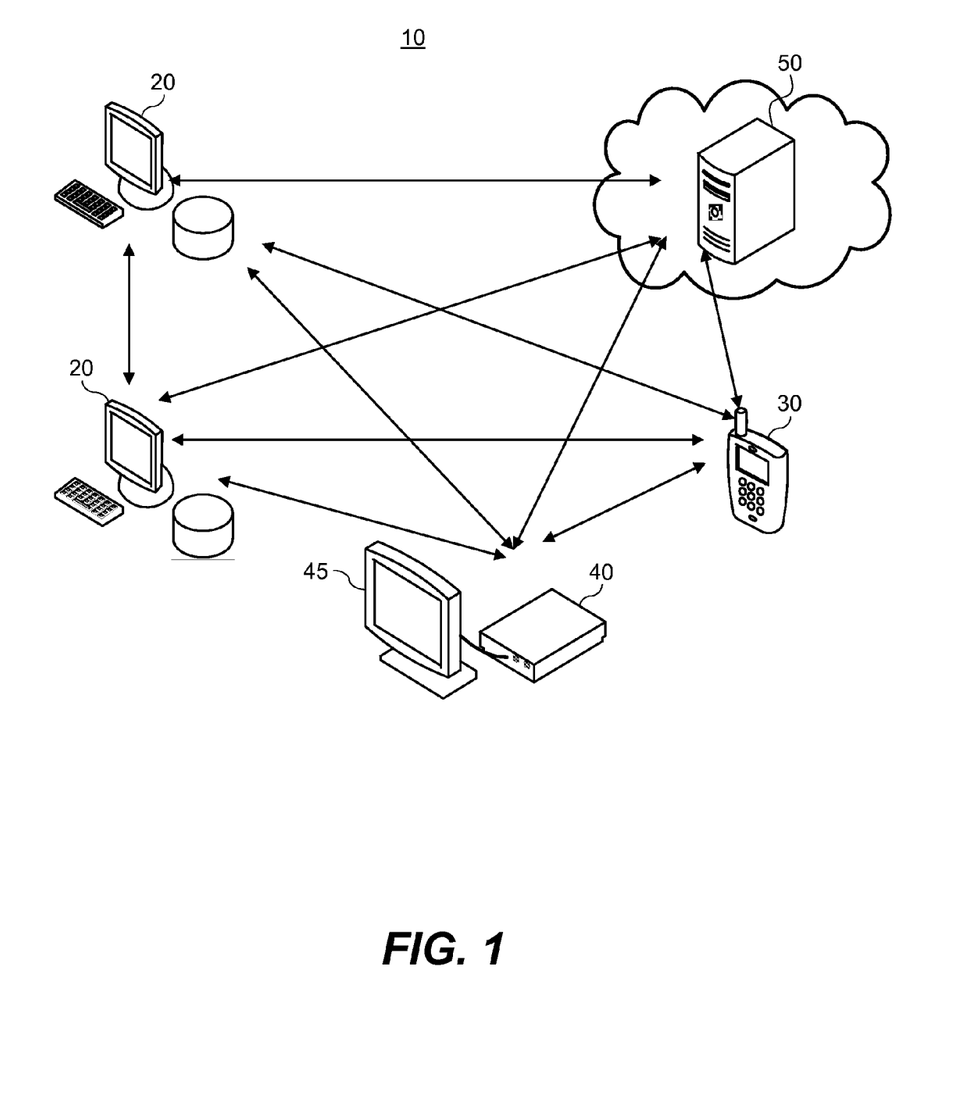
FIG. 1 shows an exemplary distributed system in accordance with the present invention.

FIG. 1 shows a general peer-to-peer network 10 for use in accordance with the present invention. The peer-to-peer network 10 is comprised of a plurality of peer nodes. Typically, some of the peer nodes on the peer-to-peer network 10 will be desktop workstations 20 in users' homes. Other peer nodes can be mobile devices 30 such as cell phones. The peer-to-peer network 10 might also contain peer nodes comprising a set-top box 40 connected to a high-definition television monitor 45. Additionally the network might contain a central node 50. The central node 50 includes one or more network servers that the creator of the network can use to supply additional services to the peer nodes. Although the preferred embodiment of this invention contains a central node 50, it is not necessary to have one except where explicitly noted.

Each node on the peer-to-peer network 10 can send requests to all other nodes on the network and can service requests from all the other nodes on the network. In a preferred embodiment of the present invention, the peer-to-peer network 10 is a mediated peer-to-peer network. A mediated peer-to-peer network is a peer-to-peer network in which a central facility helps peer nodes find each other and helps peer nodes behind different routers or firewalls communicate with each other. The preferred embodiment of this invention uses the libjingle package produced by Google to implement a mediated peer-to-peer network. However, those skilled in the art will know of many other ways of creating peer-to-peer networks, including unmediated, completely decentralized peer-to-peer networks.

In a preferred embodiment of the present invention, the video stream communicated between the peer nodes satisfies the RTSP protocol even though the data within a particular video stream being shared by a particular peer node can be encoded using a wide variety of formats. Because the RTSP protocol encodes its control information in a standard way, this invention can use that control information to allow it to deliver and control the video stream.

Figure 2:
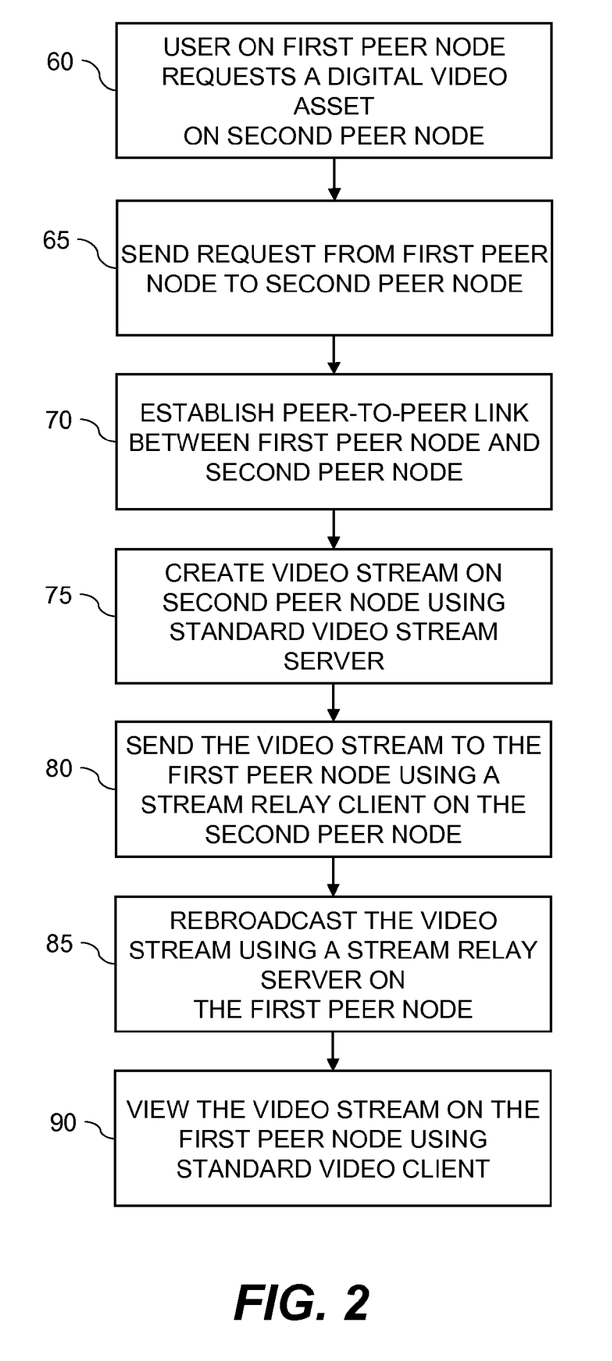
FIG. 2 shows a flow diagram outlining the method of the present invention.

FIG. 2 shows a flow chart illustrating the method of the present invention. First, a user on a first peer node in a peer-to-peer network initiates a request to view a digital video asset on a second peer node using a request digital video asset step 60. Next, a send request step 65 is used to send the request from the first peer node to the second peer node. A peer-to-peer link is then established between the first peer node and the second peer node using an establish peer-to-peer link step 70. Next, a create video stream step 75 is used to create a video stream on the second node using a video stream server. A significant advantage of the present invention is that a standard video stream server can be used that has not been specially adapted for use in a distributed peer-to-peer network. A send video stream step 80 is then used to send the video stream to the first peer node via a stream relay client on the second peer node. (The stream relay client receives the video stream from the video stream server and sends it on to the first peer node over the established peer-to-peer link.) The video stream is rebroadcast by a stream relay server the first peer node using a rebroadcast video stream step 85. Finally, a view video stream step 90 is used to view the video stream on the first peer node using a video stream client. Again, a significant advantage of the present invention is that a standard video stream client can be used that has not been specially adapted for use in a distributed peer-to-peer network.

Figure 3:
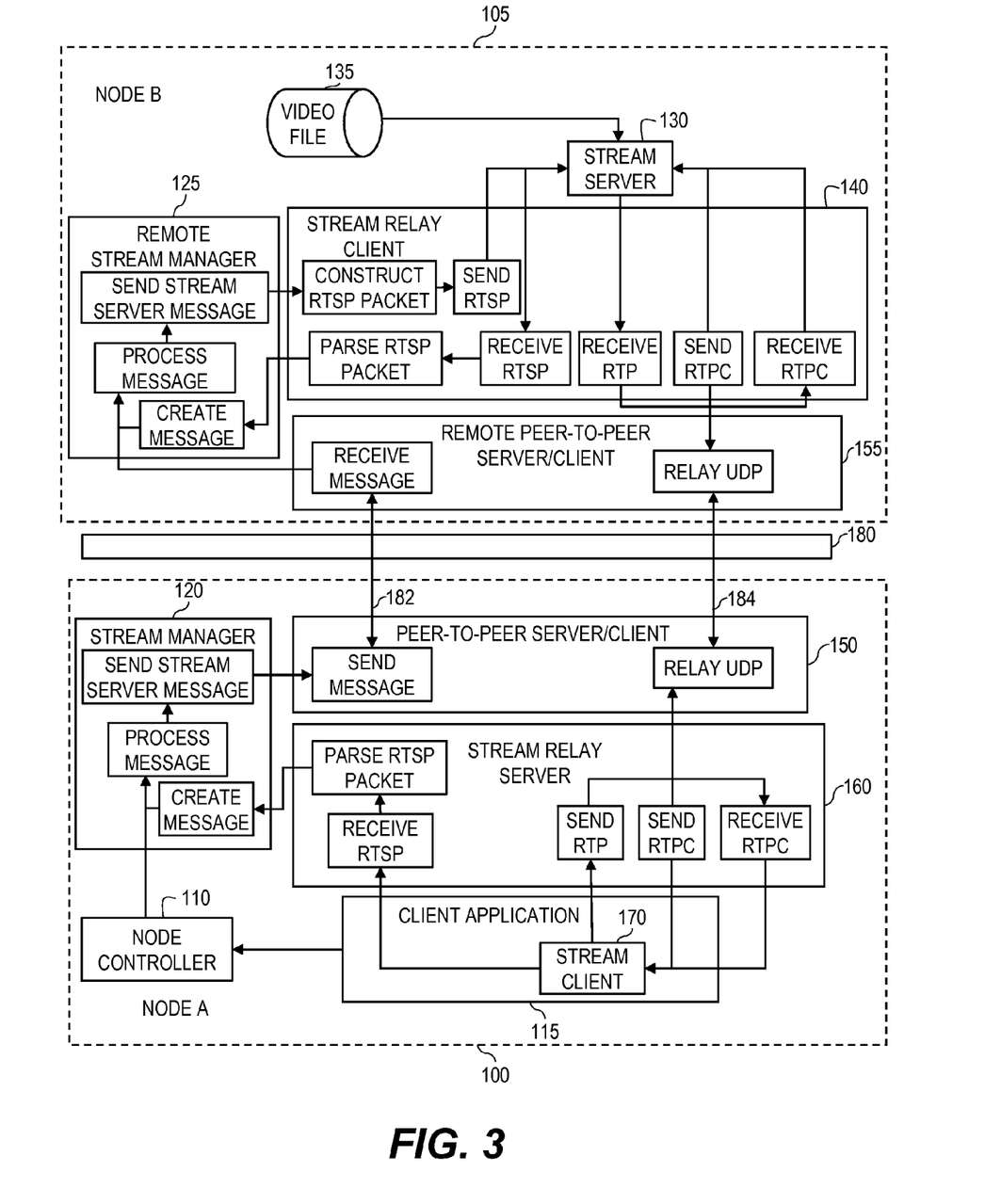
FIG. 3 is a diagram showing the components of a first local peer node and a second remote peer node that are used to enable video streaming.

FIG. 3 shows the components of a distributed network that are involved with peer-to-peer transfer of a digital video asset between peer nodes. The diagram shows the components involved when a user running an application located a first peer node 100 (Node A) wishes to view a digital video asset located on a second peer node 105 (Node B). Note that although FIG. 3 only shows the components which are active for this particular transaction, each peer node will generally contain the same set of components. Each of these components will now be described.

Each peer node has a node controller 110 that provides over-all management of the peer node. It includes a database containing information about the location of all digital video assets within the peer-to-peer network to which the user has access. The node controller 110 uses the peer-to-peer links with other peer nodes to find out about digital video assets available on other peer nodes and to inform other peer nodes about digital video assets available on its own peer node. The techniques that can be used for maintaining and synchronizing this database are familiar to those skilled in the art of designing distributed network systems. The node controller 110 is also the component of the distributed network to which a client application 115 communicates in order to initiate the streaming process for a digital video asset.

Stream manager 120 (and remote stream manager 125) controls the steps of creating and transmitting streams between peer nodes. The Stream manager 120 sends and receives messages to/from other components on its own peer node. The stream manager 120 can indirectly communicate with remote stream managers 125 on other peer nodes by sending messages via peer-to-peer server/clients 150 and 155.

Stream server 130 reads a video file 135 and creates a video stream in a standard video format. An important advantage of the present invention is that Stream server 130 can be a standard video stream server that has not been specially adapted for use in a distributed network. This allows that stream server 130 to be independent of the other system components. Likewise, stream client 170 can also be independent of the other system components. In a preferred embodiment of this invention, the stream server 130 is the Quicktime Darwin Streaming server. However, it can be any video server which uses to the RTSP protocol. This protocol defines a standard way of transmitting video streams. The RTSP protocol contains the following sub-channels:

- A TCP channel for transmitting control information between the server and client and between client and server. The control information can include commands to start, stop, and pause the stream.
- A UDP channel for transmitting the video data itself. The content of this channel follows the RTP protocol.
- A UDP channel for transmitting quality of service (QOS) data from the client back to the server. This QOS data is used by the server to adjust its sampling rate so that the client sees the best quality possible. This channel is encoded using the RTCP protocol.

Stream relay client 140 acts as a client for the stream server 130. It intercepts transmissions from the stream server 130 and redirects them to the remote peer-to-peer server/client 155. It also sends RTPC data received by the peer-to-peer server/client 155 to the stream server 130. It controls the action of the stream server 130 via standard RTSP instructions.

Peer-to-peer server/clients 150 and 155 create and maintain the peer-to-peer link 180 between different peer nodes. In a preferred embodiment of the present invention, the peer-to-peer link 180 consists of two channels. The first is a reliable TCP-based node-to-node messaging channel 182 used for transmitting messages between peer nodes, while the second is a UDP-based peer-to-peer data channel 184 used for transmitting data. In a preferred embodiment, the messaging channel 182 uses the XMPP protocol to transmit commands and also to set up the data channel for data transmission. The peer-to-peer server/clients 150 and 155 transmit/receive the various components of the video stream using both the messaging channel 182 and the data channel 184 as appropriate. It sends the RTSP commands by way of the node-to-node messaging channel 182 and sends the UDP packets comprising the RTP and RTCP streams over the peer-to-peer data channel 184.

Stream relay server 160 rebroadcasts data it receives from the peer-to-peer server/client 130 to client application 115. The only assumption it makes about the video stream is that it has been organized and encoded according to the RTSP standard.

Client Application 115 is an application which makes use of the method of the present invention to allow a user to view digital videos assets. The design of the present invention makes it particularly easy to design and implement such a client application 115 without having to know much about the internal workings of the overall peer-to-peer network system. The client application 115 can contain any standard RTSP stream client 170 that can receive video streams from any streaming server and display them. The only assumption the client application 115 makes about the video stream is that it has been encoded according to the RTSP standard. In a preferred embodiment of this invention the stream client is the Apple Quicklime COM object.

The process of video streaming from one peer node to another goes through the following steps:

1. Client application 115 on first node 100 asks the node controller 110 to supply it a stream URL for a particular digital video asset. The client application 115 also tells the node controller 110 which video formats its stream client 170 is able to support.
2. The node controller 110 determines which peer node the digital video asset resides on. It then uses peer-to-peer link 180 to send a stream request message via the node-to-node messaging channel 182 from the stream manager 120 to the remote stream manager 125 on the second peer node 105 that was identified as having the requested digital video asset. The stream request message generally will include a list of CODECS supported by the client application 115.
3. The remote stream manager 125 verifies that video file 135 for the requested digital video asset exists and that it is a valid video file. It may copy the video file 135 to a temporary directory if necessary. It then constructs a stream URL which points to the requested video file 135, based on whatever conventions are used by the stream server 130. The remote stream manager 125 on the second peer node 105 also creates a unique stream ID which identifies the stream to the peer-to-peer network, and saves the association between the stream ID and the stream URL in its local data base. It also creates a stream acknowledgement message containing the stream ID and sends the stream acknowledgement message back to the stream manager 120 on the first peer node 100 over the peer-to-peer link 180.
4. The stream manager 120 on the first peer node 100 creates a local stream URL which points to the local stream relay server 160. This local stream URL contains the stream ID. It saves the association between the stream ID and the second peer node 105 that the stream acknowledgement message came from.
5. The originating node controller 110 gives the client-side local stream URL it received back to the client application 115. The client application 115 gives this URL to its stream client 170 which initiates the process of viewing the video stream.
6. The stream client 170 starts sending RTSP packets using the local stream URL it was given, which points to the stream relay server 160 on the first node 100. The stream relay server 160 passes the RTSP packets it receives to the local stream manager 120, along with control information which it is able to extract from the RTSP packet. Because the RTSP packets contain the stream URL, and because the client-side stream URL's contain the stream ID, the stream relay server 160 will be able to tell which RTSP packet corresponds to which video stream. The stream manager 120 puts this information, along with the packet itself into a message which it sends to the remote stream manager 125 on the second peer node 105 that contains the digital video asset via the node-to-node messaging channel 182. In some cases the stream manager 120 may perform other processing, depending on the control information extracted from the RTSP packet.

7. The remote stream manager 125 on the second peer node 105 that contains the digital video asset receives the messages containing RTSP packets and gives each packet it receives to its local stream relay client 140 so that they can be sent to the stream server 130 using the actual stream URL created in step 3. In some cases the remote stream manager 125 may perform other processing, depending on the content of the RTSP packet.

8. At some point, the client application 115 sends a RTSP START command to the stream relay server 160. The stream relay server 160 will relay this command to the local stream manager 120, which in turn will send it to the remote stream manager 125. The stream relay server 160 will also tell the local peer-to-peer server/client 150 to open up a peer-to-peer UDP data channel 184 for the return RTCP stream.

9. The remote stream manager 125 will tell its stream relay client 140 to send an RTSP START message to the local stream server 130, and also tell the remote peer-to-peer server/client 155 to open up a peer-to-peer UDP data channel 184 for the video stream.

10. At this point the stream relay client 140 on the second peer node 105 will start reading the RTP stream produced by the stream server 130. As it reads each packet, it will send it to the first node 100 using the peer-to-peer UDP data channel 184. It will also start to read control and Quality of Service (QoS) data coming back from the first peer node 100 over the peer-to-peer UDP data channel 184. The QoS data is forwarded on to the stream server 130.

11. Meanwhile, the stream relay server 160 on the first peer node 100 is reading the UDP packets being received through the peer-to-peer UDP data channel 184 by the peer-to-peer server/client 150. As it receives each packet, it passes it on to the client application 115 as part of a standard RTP stream. The stream relay server 160 will also be receiving QoS data from the client application 115. It will send these back through the peer-to-peer UDP data channel 184 to the second peer node 105 containing the digital video asset.

12. At some point, the user might hit the pause control in the user interface of the stream client 170. The stream client 170 then sends a RTSP PAUSE command. The stream relay server 160 receives this command and gives it to the stream manager 120 which converts it to a system RTSP message and sends it to the remote stream manager 125 on the second peer node 105 via the node-to-node messaging channel 182 as described in steps 5 and 6. The remote stream manager 125 tells the remote peer-to-peer server/client 155 to shut down the peer-to-peer channel.

13. Eventually, the client application 115 will terminate the streaming by sending a RTSP TEARDOWN command. The stream manager 120 and the remote stream manager 125 will respond to this command by releasing all resources connected with that stream.

The net effect of this processing is that the stream server 130 on the second peer node 105 can broadcast a video stream to a local client (the stream relay client 140), while the stream client 170 on the first peer node 100 can receive a broadcast from a local server (the stream relay server 160). It is this feature of the invention which allows the use of standard, unmodified stream servers and clients.

Figure 4:
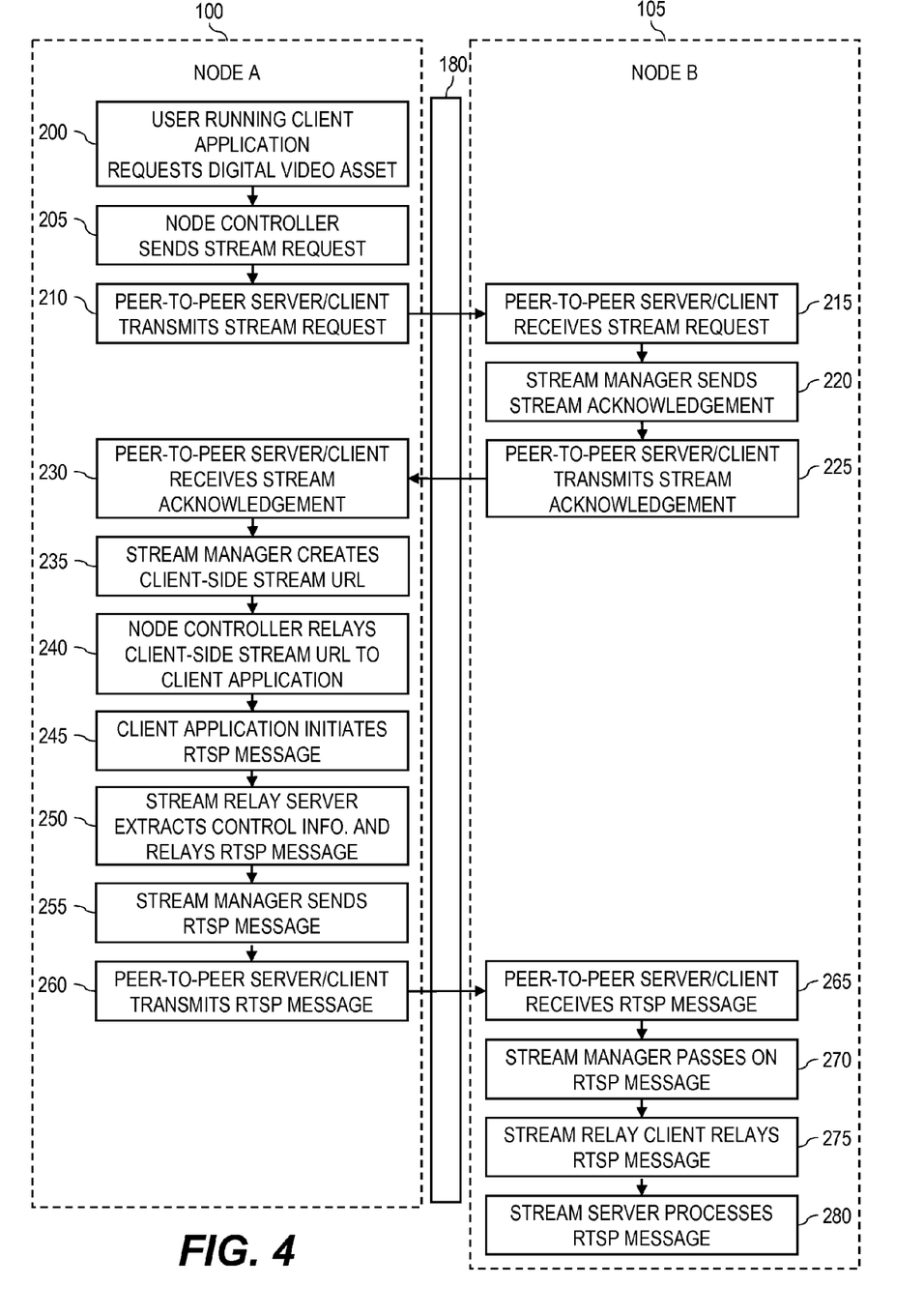
FIG. 4 is a flow diagram showing the steps of setting up the streaming of a video from a second peer node to a first peer node.

FIG. 4 shows a flow chart illustrating the communication between the peer nodes in a time sequential fashion. This example shows the steps of setting up and processing the request to initiate transmission of the video stream. The steps are segmented into those that are performed on the first peer node 100 (Node A) and the second peer node 105 (Node B) which communicate over peer-to-peer link 180.

First, a user running a client application 115 (FIG. 3) requests to view a digital video asset using a request digital video asset step 200. Node controller 110 (FIG. 3) then determines that the requested digital video asset is on the second peer node 105 and initiates a stream request using a stream request step 205. The peer-to-peer server/client 150 (FIG. 3) transmits the stream request using a transmit stream request step 210. The remote peer-to-peer server/client 155 (FIG. 3) on the second peer node 105 receives the stream request using a receive stream request step 215. The remote stream manager 125 (FIG. 3) then creates a stream URL and stream ID and initiates the sending of an acknowledgement back to the first peer node 100 using a stream acknowledgement step 220. The remote peer-to-peer server/client 155 (FIG. 3) transmits the stream acknowledgement to the first peer node 100 using a transmit stream acknowledgement step 225. The stream acknowledgement is received by the peer-to-peer server/client 150 (FIG. 3) on the first peer node 100 using a receive stream acknowledgement step 230.

Next, stream manager 120 (FIG. 3) creates a client-side stream URL using a create client-side stream URL step 235. Node controller 110 (FIG. 3) relays the client-side stream URL to the client application 115 (FIG. 3) using a relay client-side stream URL step 240.

The client application 115 (FIG. 3) gives the client-side stream URL to its stream client 170 (FIG. 3) which responds by sending an RTSP packet containing RTSP commands to the local stream relay server 160 (FIG. 3) using an initiate RTSP message step 245.

The stream relay server 160 (FIG. 3) extracts control information from the RTSP packet and sends an RTSP message containing the RTSP packet and control information to the stream manager 120 (FIG. 3) using a relay RTSP message step 250. The stream manager 120 (FIG. 3) then sends the RTSP message on to the peer-to-peer server/client 150 (FIG. 3) using a send RTSP message step 255.

The peer-to-peer server/client 150 (FIG. 3) then transmits the RTSP message to the second peer node 105 using a transmit RTSP message step 260. The RTSP message is received by the remote peer-to-peer server/client 155 (FIG. 3) on the second peer node 105 using a receive RTSP message step 265. The RTSP message is passed on to the stream relay client 140 (FIG. 3) via the remote stream manager 125 (FIG. 3) using a pass on RTSP message step 270. Finally, the RTSP message is passed on to the stream server 130 (FIG. 3) using a relay RTSP message step 275. The stream server 130 (FIG. 3) then processes the commands in the RTSP message using a process RTSP message step 280 and initiates the appropriate action (e.g., initiating transmission of the video stream).

Because of the many formats and encodings used for digital videos, it often happens that the video stream client 170 (FIG. 3) is not able to display the format and encoding used in the video file 135. In those cases, it is necessary to transcode the video stream, i.e. it is necessary to convert the video stream into a format which the video stream client 170 can read. When a client application 115 wishes to display a video, it specifies which video formats it is capable of receiving. The remote stream manager 125 on the second peer node 105 containing the video file 135 causes the video stream to be transcoded to a format the client application 115 can receive. Because this invention allows each peer node to have a different stream server 130, the system is designed to allow for the fact that each endpoint of the video stream has different transcoding capabilities. There are a number of ways the system can do this:

- If the stream server 130 on the second peer node 105 containing the video file 135 is capable of transcoding while it creates the video stream, the remote stream manager 125 can direct the stream server 130 to do so.
- The stream server 130 can create a transcoded copy of the video file. This option does involve a time-consuming step of making the transcoded copy, which must take place before the user can start watching the video. However, the system can cache the transcoded copy for a set interval of time, so that a popular video does not have to be transcoded repeatedly.
- The second peer node 105 containing the video file 135 can contain an additional transcoding relay server which is capable of transcoding to a video format supported by the client application 115. The remote stream manager 125 can direct the video stream through that transcoding relay server before it is sent to the first peer node 100.
- The first peer node 100 can contain a transcoding relay server which is capable of transcoding to the desired format. The video stream can be directed through this relay server after it is received on the first peer node 100 but before it is sent to the client application 115.
- In cases where the distributed peer-to-peer network contains a central node, the video stream can be sent to the central node for transcoding to a video format supported by the client application 115. The transcoded video stream is then relayed on to the first peer node 100. This last option introduces delays in transmission and can degrade the quality of the received signal because of the extra network capacity it requires, but is preferable to not being able to view the video at all.

Which transcoding method is used depends on the capabilities of the source and destination nodes. If only one of the peer nodes is able to transcode the video stream, then the transcoding must take place on that peer node. If both peer nodes are able to transcode the video stream, then it is generally desirable to configure the system so that the transcoding will occur at whichever peer node results in a smaller amount of data being transmitted over the peer-to-peer link 180. If neither peer node is able to transcode the video stream to a video format supported by the client application 115 and a central node is available then the video stream is sent to the central node, transcoded, and then sent to the destination. Note that although the video data can be encoded in a wide variety of formats, the video stream itself is organized according to the RTSP protocol, and can therefore be transmitted and controlled by this invention.

In a similar way, it can happen that the display size and resolution of the digital video asset does not match the requirements of the device on which the video will be viewed. This is a common occurrence because of the wide variety of internet-capable devices that are now available. Spatial resampling of the video stream can also be done by specialized stream relay servers present on either peer node or on a central node. The rules for deciding which method to use is similar to the rules for deciding on which peer node the transcoding should take place.

In some cases, it may also be desirable to apply a video enhancement step to enhance the quality of the video data. Examples of common video enhancement steps would include sharpening, noise/artifact removal and tone/color processing. Video enhancement steps can be applied on either peer node or alternatively on a central node depending on where appropriate video enhancement software may reside. The rules for deciding where the video enhancement step should be applied is similar to the rules for deciding on which peer node the transcoding should take place.

In some cases, access to the digital video asset may be controlled by access permissions granted to the user by an owner of the digital video assets. The access permissions may be used to control what types of processing steps (e.g., transcoding, resizing or video enhancement) may be applied to the digital video asset. In some usage scenarios, the user may be required to make a payment in order to gain access to the one or more of the processing steps. For example, a charge may be levied to access transcoding or video enhancement services on a central node. The charge may be in the form of a one-time payment, or may be collected in the form of a subscription fee. Different service levels may be provided for different subscription fees. For example, basic transcoding services for a limited number of video formats may be provided for a basic service level that is available free-of-charge. An intermediate service level may provide transcoding services to additional video formats for a monthly subscription fee, and a deluxe service level may provide access to video enhancement for a higher subscription fee.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST

| | |
|---|---|
| 10 | Peer-to-peer network |
| 20 | Desktop workstation |
| 30 | Mobile device |
| 40 | Set-top box |
| 45 | Television monitor |
| 50 | Central node |
| 60 | Request digital video asset step |
| 65 | Send request step |
| 70 | Establish peer-to-peer link step |
| 75 | Create video stream step |
| 80 | Send video stream step |
| 85 | Rebroadcast video stream step |
| 90 | View video stream step |
| 100 | First peer node |
| 105 | Second peer node |
| 110 | Node controller |
| 115 | Client application |
| 120 | Stream manager |
| 125 | Remote stream manager |
| 130 | Stream server |
| 135 | Video file |
| 140 | Stream relay client |
| 150 | Peer-to-peer server/client |
| 155 | Remote peer-to-peer server/client |
| 160 | Stream relay server |
| 170 | Stream client |
| 180 | Peer-to-peer link |
| 182 | Messaging channel |
| 184 | Data channel |
| 200 | Request digital video asset step |

-continued

| | |
|---|---|
| 205 | Stream request step |
| 210 | Transmit stream request step |
| 215 | Receive stream request step |
| 220 | Stream acknowledgement step |
| 225 | Transmit stream acknowledgement step |
| 230 | Receive stream acknowledgement step |
| 235 | Create client-side stream URL step |
| 240 | Relay client-side stream URL step |
| 245 | Initiate RTSP message step |
| 250 | Relay RTSP message step |
| 255 | Send RTSP message step |
| 260 | Transmit RTSP message step |
| 265 | Receive RTSP message step |
| 270 | Pass on RTSP message step |
| 275 | Relay RTSP message step |
| 280 | Process RTSP message step |

The invention claimed is:

1. A method for viewing digital video assets using a distributed network having a plurality of interconnected nodes, comprising:
   receiving a request from a user on a first node of the distributed network to view a digital video asset stored on a second node of the distributed network;
   relaying the request from the first node of the distributed network to the second node of the distributed network;
   establishing a peer-to-peer link between the first node of the distributed network and the second node of the distributed network;
   creating a video stream in a standard video stream format from the requested digital video asset on the second node of the distributed network using a standard video stream server that has not been specially adapted for use in a distributed network;
   receiving the video stream using a stream relay client on the second node of the distributed network;
   converting the video stream on the stream relay client into a form that is compatible with the peer-to-peer link;
   sending the converted video stream from the second node of the distributed network to the first node of the distributed network over the peer-to-peer link;
   receiving the converted video stream using a stream relay server on the first node of the distributed network;
   converting the converted video stream on the stream relay server into a standard video stream form, forming a standard video stream; and
   viewing the standard video stream on the first node of the distributed network using a standard video stream client that has not been specially adapted for use in a distributed network.

2. The method of claim 1 wherein the peer-to-peer link is a bi-directional link, and further including the step of sending video control information from the first node of the distributed network to the second node of the distributed network.

3. The method of claim 1 wherein the peer-to-peer link is a bi-directional link, and further including the step of sending quality of service information from the first node of the distributed network to the second node of the distributed network.

4. The method of claim 1 wherein the step of creating the video stream includes:
   determining a node of the distributed network for applying one or more processing steps to video data for the requested digital video asset based on node processing capabilities; and
   applying the one or more processing steps to the video data for the requested digital video asset at the determined node.

5. The method of claim 4 wherein the one or more processing steps include a video enhancement step to enhance the quality of the video data, a resizing step to resize the video data according to video viewing capabilities of the first node of the distributed network, or a transcoding step to transcode the video data according to video viewing capabilities of the first node of the distributed network.

6. The method of claim 1 wherein the distributed network includes a third node and wherein the step of sending the converted video stream from the second node of the distributed network to the first node of the distributed network includes relaying the converted video stream through the third node of the distributed network.

7. The method of claim 6 further including applying one or more processing steps to video data for the requested digital video asset on the third node of the distributed network.

8. The method of claim 7 wherein the processing steps that are applied are responsive to access permissions granted to the user by an owner of the digital video assets.

9. The method of claim 7 wherein the processing steps that are applied are responsive to a payment made by the user.

10. The method of claim 7 wherein the processing steps that are applied are responsive to a service level subscribed to by the user.

11. The method of claim 7 wherein the one or more processing steps include a video enhancement step to enhance the quality of the video data.

12. The method of claim 7 wherein the one or more processing steps include a resizing step.

13. The method of claim 12 wherein the video data is resized to a viewing resolution according to video viewing capabilities of the first node of the distributed network.

14. The method of claim 7 wherein the one or more processing steps include a transcoding step to transcode the video data according to video viewing capabilities of the first node of the distributed network.

* * * * *